United States Patent
Patel et al.

(10) Patent No.: US 9,086,906 B2
(45) Date of Patent: Jul. 21, 2015

(54) APPARATUS AND METHOD FOR GUEST AND ROOT REGISTER SHARING IN A VIRTUAL MACHINE

(75) Inventors: Sanjay Patel, San Ramon, CA (US); Ranjit Joseph Rozario, San Jose, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 470 days.

(21) Appl. No.: 13/436,654

(22) Filed: Mar. 30, 2012

(65) Prior Publication Data

US 2013/0263124 A1    Oct. 3, 2013

(51) Int. Cl.
*G06F 9/455*    (2006.01)
(52) U.S. Cl.
CPC ................... *G06F 9/4555* (2013.01)
(58) Field of Classification Search
CPC ................................ G06F 9/45533
See application file for complete search history.

(56) References Cited

U.S. PATENT DOCUMENTS

| | | | |
|---|---|---|---|
| 8,312,452 B2 * | 11/2012 | Neiger et al. | 718/1 |
| 8,484,640 B1 * | 7/2013 | Dobrovolskiy et al. | 718/1 |
| 2012/0190338 A1 * | 7/2012 | Andersson et al. | 455/411 |

* cited by examiner

*Primary Examiner* — Mengyao Zhe
(74) *Attorney, Agent, or Firm* — Cooley LLP

(57) ABSTRACT

A computer readable storage medium includes executable instructions to define a processor with guest mode control registers supporting guest mode operating behavior defined by guest context specified in the guest mode control registers. The guest mode control registers include a control bit to specify a guest access blocked register state and a shared register state. Root mode control registers support root mode operating behavior defined by root context specified in the root mode control registers. The root mode control registers include control bits to enable replicated register state access and shared register state access. The guest context and the root context support virtualization of hardware resources such that multiple operating systems supporting multiple applications are executed by the hardware resources.

15 Claims, 4 Drawing Sheets

APPARATUS AND METHOD FOR GUEST AND ROOT REGISTER SHARING IN A VIRTUAL MACHINE

CROSS-REFERENCE TO RELATED APPLICATION

This application is related to the commonly owned patent application entitled "Microprocessor System for Virtual Machine Execution", Ser. No. 12/891,530 filed Sep. 27, 2010, the contents of which are incorporated herein by reference.

FIELD OF THE INVENTION

This invention relates generally to microprocessors. More particularly, this invention relates to a microprocessor with extended operating modes to support virtual machine execution.

BACKGROUND OF THE INVENTION

A traditional computer operating system (OS) shares the resources of a single machine between multiple user programs or applications. The OS kernel controls all system resources, including execution time, access to instruction and data memory, I/O devices, and inter-process communication. The system resources typically include a microprocessor with at least two levels of privilege, a set of privileged machine-control instructions and registers, a virtual memory system using address translation, and an exception system.

Virtualization is a technique by which multiple operating systems share a single machine. Each "guest" operating system runs within a virtual machine (VM), which appears to have the same privileged instructions, registers and I/O devices as the real machine, but this appearance is an illusion managed by a piece of software known as a hypervisor. The hypervisor is in full control of machine resources at all times. Guest operating systems no longer have unrestricted access to machine resources—they are "de-privileged". All operations performed by a guest must be explicitly permitted by the hypervisor.

The hypervisor is responsible for sharing system resources between multiple VMs, and maintaining the expected behavior of each VM. The hypervisor performs the same basic functions as the traditional OS kernel, except that the hypervisor's clients are full operating systems rather than user applications.

FIG. 1 illustrates a prior art virtualization system 100. The system 100 includes a first set of applications 102_1 through 102_N executing on a first operating system 104, and a second set of applications 106_1 through 106_N operating on a second operating system 108. A hypervisor 110 operates between the operating systems 104 and 108 and a set of hardware resources 112_1 through 112_N. In particular, the hypervisor 110 controls access to the hardware resources 112 while executing functions specified by the applications. The hardware resources 112 may be a central processing unit, a graphics processing unit, memory, input/output devices, and the like.

The traditional approach to virtualization for a microprocessor with two levels of privilege (e.g., user and kernel) is known as de-privileging. With de-privileging, a guest operating system kernel is executed in user mode instead of the expected kernel mode. Accesses to a privileged resource from the guest kernel results in an exception (trap) that is handled (emulated) by the hypervisor. This scheme is possible if all privileged operations result in exceptions when executed from user mode, and the full user-mode address space can be translated. The performance of such a trap-and-emulate system is limited by the many hypervisor exceptions that must be processed.

In view of the foregoing, it would be desirable to provide an improved microprocessor to efficiently execute virtualized guest operating systems under the control of a hypervisor. More particularly, it would be desirable to reduce hypervisor software processing operations through utilization of improved microprocessor virtualization resources that support virtual machine execution.

SUMMARY OF THE INVENTION

A computer readable storage medium includes executable instructions to define a processor with guest mode control registers supporting guest mode operating behavior defined by guest context specified in the guest mode control registers. The guest mode control registers include a control bit to specify a guest access blocked register state and a shared register state. Root mode control registers support root mode operating behavior defined by root context specified in the root mode control registers. The root mode control registers include control bits to enable replicated register state access and shared register state access. The guest context and the root context support virtualization of hardware resources such that multiple operating systems supporting multiple applications are executed by the hardware resources.

A computer readable storage medium includes executable instructions to define a processor with root mode control registers storing root context defining privileged machine state. The root mode control registers include control bits to enable access to replicated privileged machine state and shared access to the privileged machine state. Guest mode control registers store guest context defining guest execution permissions. The guest mode control registers include a control bit to specify a guest access blocked register state and a guest shared register state enabling access to either the replicated privileged machine state or the privileged machine state. The guest context and the root context support virtualization of hardware resources such that multiple operating systems supporting multiple applications are executed by the hardware resources.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Microprocessor architectures have well defined operating modes. For example, MIPS Technologies, Inc., Sunnyvale, Calif., sells microprocessor IP designs with pre-existing kernel, user and supervisor operating modes that can be referred to as root-kernel, root-user and root-supervisor respectively.

Processor behavior during kernel and user mode execution is controlled by privileged machine state. This state may be read or written only in kernel mode. An attempt to access privileged state from user mode results in an exception, returning control to kernel mode. Privileged machine state includes, but is not limited to, the operating mode of the processor, address translation and virtual memory controls, debug and breakpoint configuration and power management controls. The set of privileged machine-control state is referred to as privileged context.

Virtualized guests may be defined in a limited privilege guest mode, which is orthogonal to existing kernel, supervisor and user modes. In one embodiment, the guest mode comprises guest-kernel, guest-supervisor and guest-user modes. This results in six privilege levels: root-kernel, root-supervisor, root-user, guest-kernel, guest-supervisor and guest-user. The supervisor mode is generally omitted from the figures for simplicity. A hypervisor has access to all machine resources. The guest-kernel level is granted access to virtualized machine resources, controlled by the hypervisor. Traditionally, the guest-user level is equivalent to the existing unprivileged user mode, except that user/kernel transitions within the guest OS are made between the guest-user and guest-kernel.

The guest mode allows the separation between kernel, user and supervisor modes to be retained for a guest operating system running within a virtual machine. The guest-kernel mode has sufficient privilege to handle guest interrupts and guest exceptions, and to manage virtual memory for guest processes. The separation between root mode and the limited-privilege guest mode allows root mode software to be in full control of the machine at all times. Thus, backward compatibility is retained for existing software running in root mode.

Known virtualization solutions use context switching to enable transitions between guest and non-guest modes. A common set of privileged machine state is used by both guest and non-guest modes. Transitions between root and guest modes are performed by context switching the contents of entering and exiting contexts. For example, the privileged state of the exiting mode is written out to an area of memory and the privilege state of the entering mode is restored from a different area of memory. This is computationally expensive.

In accordance with an embodiment of the invention, this computation expense is reduced through selective states that enable guest and root register sharing. Consequently, transitions between root and guest modes are reduced.

Figure 2:
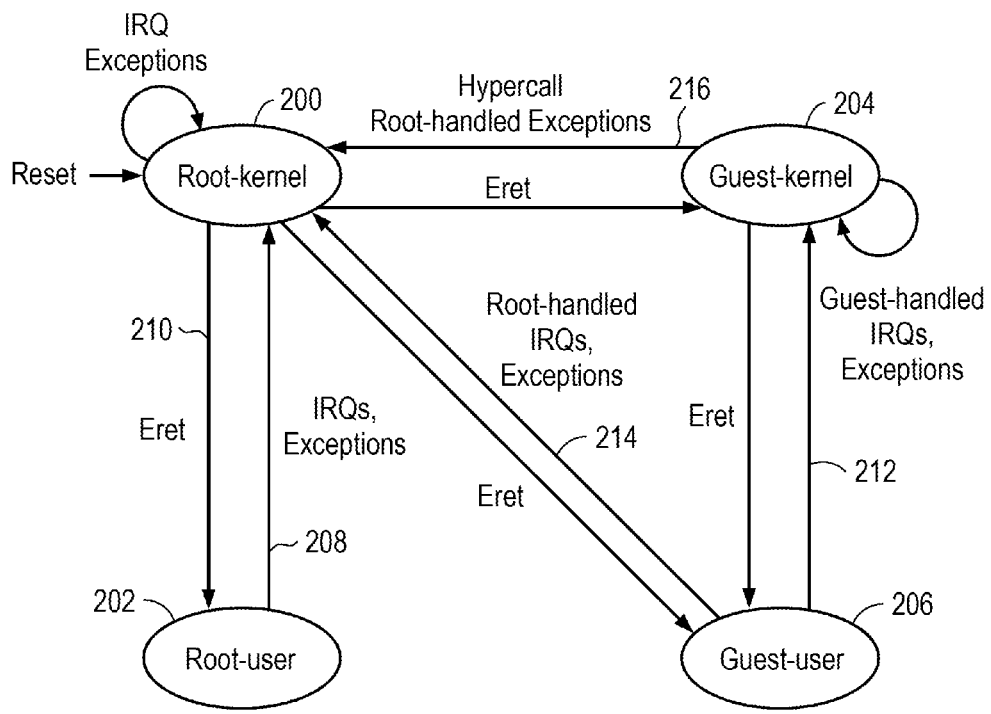
FIG. 2 illustrates root and guest state transitions implemented in accordance with an embodiment of the invention.

FIG. 2 illustrates transitions between operating modes in a virtual machine with root and guest modes. The figure illustrates root-kernel mode 200 and root-user mode 202. The root-kernel mode handles interrupt requests (IRQs) and exceptions generated in the root-kernel mode 200, as well as those generated in the root-user mode 202. As shown with arrow 208, an IRQ or exception generated in the root-user mode 202 is passed to the root-kernel mode 200 for processing. The results are passed with a return from exception (ERET) instruction, as shown with arrow 210.

FIG. 2 also illustrates a guest-kernel mode 204 and a guest user mode 206. Exceptions generated in guest-kernel mode can be handled by guest-kernel mode (arrow back to itself), or by root-kernel mode as indicated with arrow 216. Exceptions generated in guest-user mode may be handled by the guest-kernel 204, as indicated with arrow 212, or may be handled by root-kernel mode as indicated with arrow 214. Return from the exception handler is performed with an ERET instruction. The mode (guest-kernel or root-kernel) in which the exception is handled is determined from how the exception was generated. If a setting within the guest-mode privileged context caused the exception to be generated, the exception is handled within guest mode. If a setting within the root-mode privileged context caused the exception to be generated, the exception is handled in root mode.

Thus, operations originating inside the guest virtual machine (e.g., instruction execution, memory access requests) must first be checked against the guest privileged context and then checked against the root privileged context.

Figure 3:
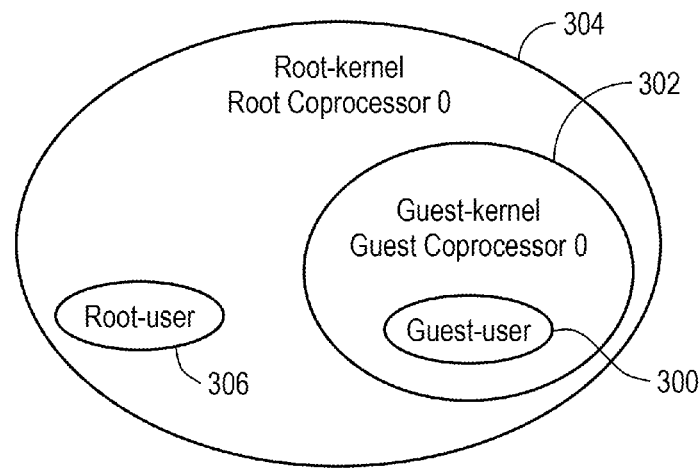
FIG. 3 illustrates concentric rings of virtualization control utilized in accordance with an embodiment of the invention.

The handling of interrupts and exceptions is handled through concentric modes of control, as shown in FIG. 3. This control technique is referred to as an 'onion model'. The 'onion model' references concentric regions of control to address translation and exception handling for guests. Three operating modes execute a virtualized guest operating system: unprivileged guest-user 300, limited-privilege guest-kernel 302 and full-privilege root-kernel 304. The root-user mode 306 is used to execute non-virtualized software. At each layer within the onion, any operation must be permitted by all outer layers.

The 'onion model' allows for a relatively simple hypervisor with a minimum of hypervisor interventions. The system allows for handling of common tasks, such as interrupt enable/disable and exception handling entirely within the guest.

An exception to the hypervisor is required only when an exception is triggered by the root privileged state, such as an address translation exception from the root-mode (second level) address translation system, a root-mode hardware breakpoint, or an external interrupt enabled in the root context.

In a MIPS processor, Coprocessor 0 contains system control registers, and can be accessed only by privileged instructions. A processor implementing operations of the invention (sometimes referred to as a Virtualization technique) contains two Coprocessor 0 (CP0) contexts—a root CP0 context and a guest CP0 context. The term 'context' refers to the software visible state held within each Coprocessor 0. The software-visible state is the contents of status/control registers, and any state which is accessed through those control registers, such as Translation Look-Aside Buffer (TLB) entries and Segmentation Configurations.

During guest mode execution, guest operations are first tested against the guest CP0 context, and then against the root CP0 context. An 'operation' is any process which can trigger an exception. This includes address translation, instruction fetches, memory accesses for data, instruction validity checks, coprocessor accesses and breakpoints.

Figure 4:
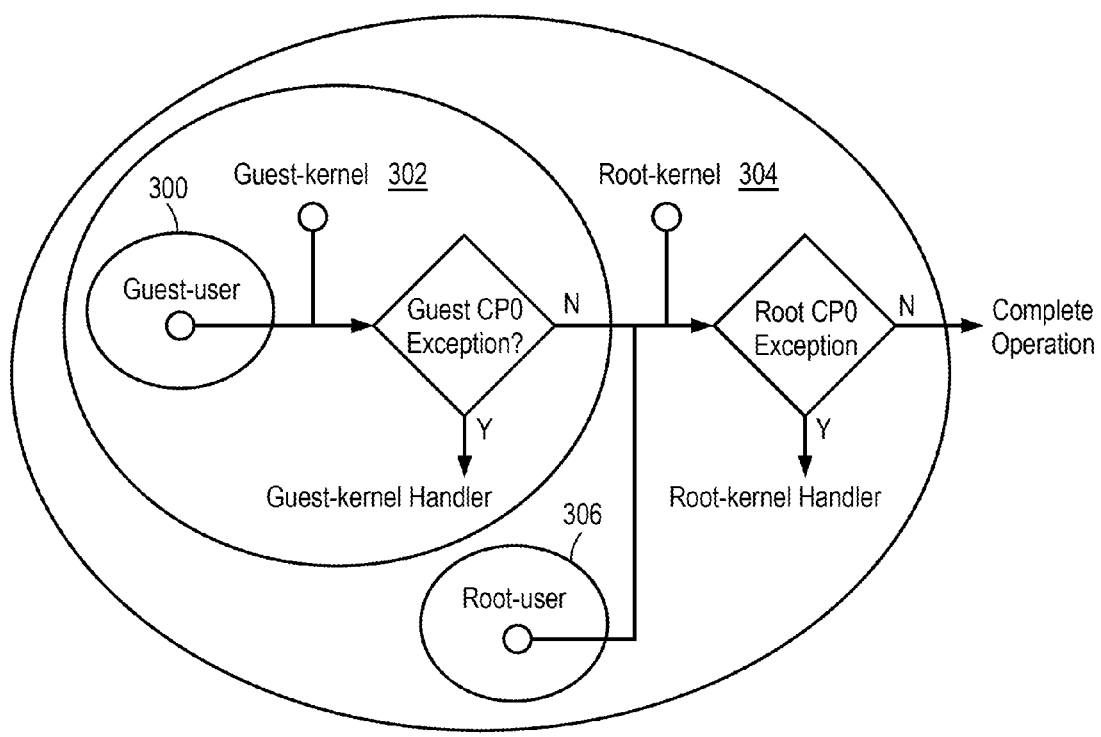
FIG. 4 illustrates exception handling utilized in accordance with an embodiment of the invention.

FIG. 4 shows the how the Virtualization 'onion model' is applied to operations starting in each of the operating modes (supervisor modes are omitted for clarity). An operation executed in guest-user mode 300 must travel from inside of the onion to the outside. That is, an operation executed in guest-user mode 300 must be verified through concentric rings of control.

The first layer to be crossed from the guest-user mode 300 is the guest CP0 context (controlled by guest-kernel mode software 302). All exception and translation rules defined by the guest CP0 context are applied, and resulting exceptions are taken in guest mode.

If the operation does not trigger a guest-context exception, the next layer to be crossed is the root CP0 context (controlled by root-kernel mode software 304). All exception and translation rules defined by the root CP0 context are applied, and resulting exceptions are handled in root mode. For example, in a MIPS system, an access to Coprocessor 1 (the Floating Point Unit) must first be permitted by a guest context status bit, and then by a root context status bit. External interrupts travel from the outside of the onion to the inside—first being parsed by the root CP0 context, and if passed on by the hypervisor software (through hardware or software means), by the guest CP0 context.

The Virtualization technique provides root-mode software with controls over the instructions that can be executed, the registers which can be accessed, and the interrupts and exceptions which can be taken when in guest mode. These controls are combined with new exceptions that return control to root mode when intervention is required. The overall intent is to allow guest-mode software to perform the most common privileged operations without root-mode intervention—including transitions between kernel and user mode, controlling the virtual memory system (the TLB) and dealing with interrupt and exception conditions.

An embodiment of the invention allows guest-mode software to perform privileged register sharing operations without root-mode intervention. Typically, a root emulates register control for a guest. As a consequence, each time a guest reads or writes to a controlled register, there is an intervention by the root, which requires a context swap.

An embodiment of the invention provides register sharing that allows a guest to access privileged registers without root intervention. This technique is most successfully used in connection with operations that are unlikely to be simultaneously performed by both the root and guest. Such operations include infrequently invoked operations and operations with high implementation costs. Example operations that may use the disclosed shared register access include debug watch, performance counting, interrupt handling, cache state monitoring and an execution unit with a cryptographic unit that is shared between the root and the guest. An embodiment of the invention is disclosed in connection with a debug watch operation.

The MIPS architecture provides registers to implement a watchpoint. These registers hold a virtual address that is checked against each load or store operation. A trap is caused if the load/store address matches. These registers are used for debug software. The registers are designated WatchLo and WatchHi.

The watch point operation utilizes privileged context. Therefore, typically, any read or write to this privileged context must be in kernel mode. However, an embodiment of the invention allows sharing of privileged registers between a guest and a root. Advantageously, a small number of control bits are used to implement this sharing operation.

Figure 1:
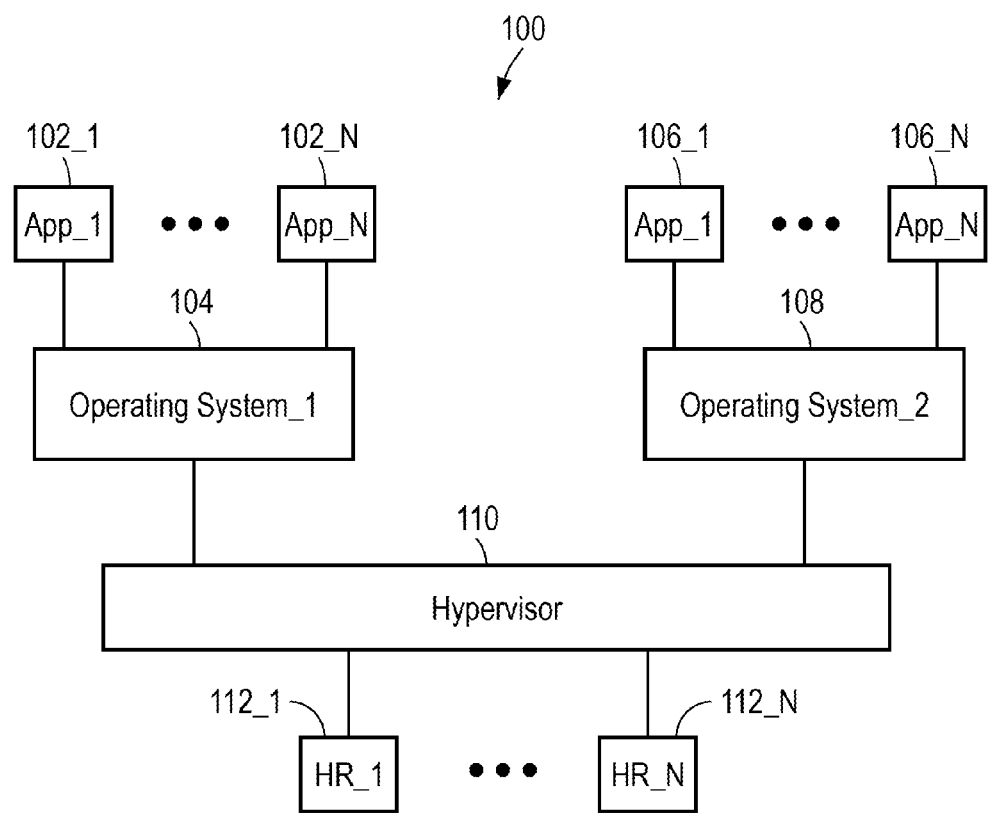
FIG. 1 illustrates a prior art virtualization system.
Figure 5:
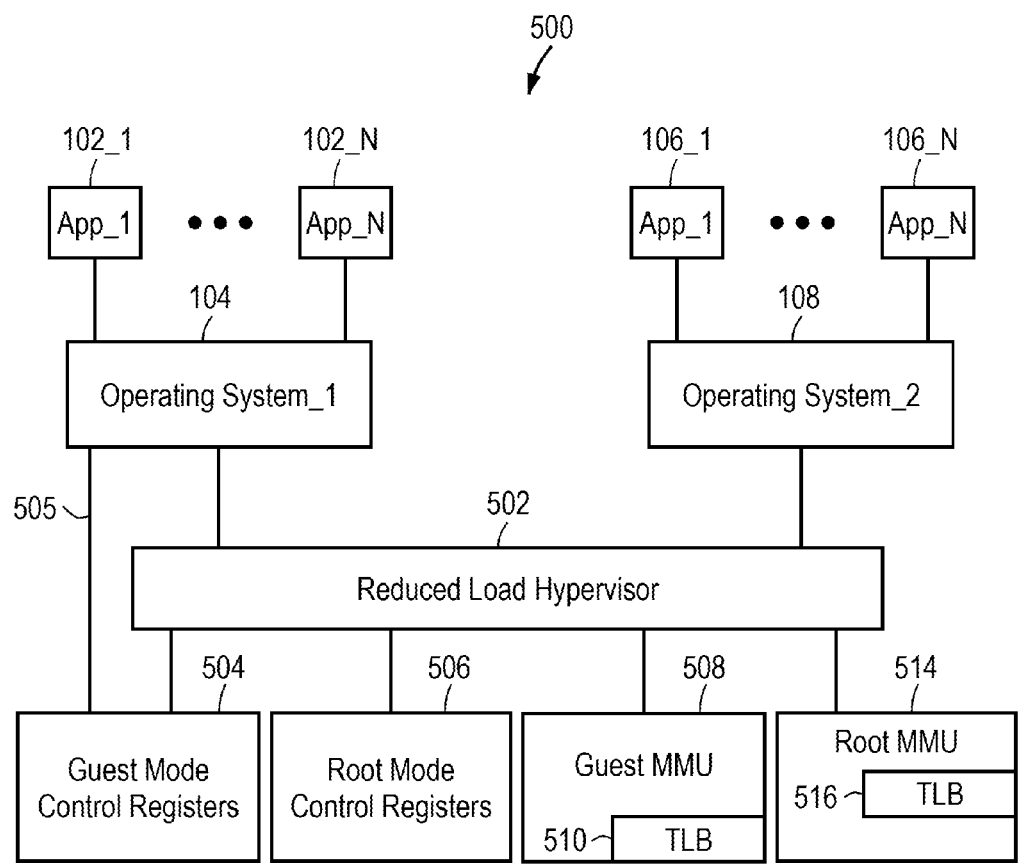
FIG. 5 illustrates a system virtualized in accordance with the invention.

FIG. 5 illustrates a system 500 virtualized in accordance with the invention. The system 500 corresponds to the system of FIG. 1 with respect to the utilization of a first operating system 104 to support a first set of applications 102_1 through 102_N and a second operating system 108 to support a second set of applications 106_1 through 106_N. However, unlike the system of FIG. 1, the system of FIG. 5 utilizes a reduced load hypervisor 502. The reduced load stems from guest mode hardware support features. These hardware support resources include guest mode control registers 504 and root mode control registers 506. As discussed above, certain root mode control registers 506 may be shared with the guest mode.

FIG. 5 also illustrates a guest mode Memory Management Unit (MMU) 508 with an associated TLB 510 that may be accessed by the reduced load hypervisor 502. The guest MMU 508 may be directly accessed by any guest operating system (e.g., 104 or 108), if permitted by the hypervisor 502.

The guest MMU 508 maintains guest virtual address (GVA) to guest physical address (GPA) mappings.

In addition, a root MMU with an associated TLB 516 may be utilized by the reduced load hypervisor 502. The Root TLB 516 maintains GVA to root physical address (RPA) mapings. In addition, it maintains root virtual address (RVA) to RPA mappings.

Separate MMUs are depicted for conceptual purposes. It should be appreciated that a single MMU with a first section performing guest operations and a second section performing root operations may also be used.

FIG. 5 illustrates a line 505 between the operating system 104 and the guest mode control registers 504. This serves to illustrate that the guest mode control registers 504 are accessible by guest operating systems (e.g., 104 and 108).

The MMU address mappings (e.g., RVA, RPA, GVA and GPA) may be used in connection with a watch point operation to illustrate an embodiment of the invention. Root and guest Watchpoint debug support is provided by Coprocessor 0 WatchHi and WatchLo register pairs. These registers are present in the root context if Root Config1$_{WR}$=1 and in the guest context if Guest Config1$_{WR}$=1. An implementation may choose to provide root-only watch register support, independent guest and root watch register support, or shared guest and root watch register support.

In Table I the state of guest Config1$_{WR}$ conveys what support is available to a guest.

TABLE I

| Row Number | Guest Config1$_{WR}$ Value | Read/Write State | Function |
| --- | --- | --- | --- |
| 1 | 0 | Read | No guest watch registers. |
| 2 | 1 | Read | Guest watch registers present as duplicated state. |
| 3 | 0 and 1 | Read (Guest) Read/Write (Root) | Virtual guest watch support provided (guest shares privileged register with root). |

Row number 1 illustrates an unsupported state (i.e., only root has a watch facility; guest does not have access to a watch facility). Row number 2 illustrates access to guest watch registers through duplicated state (replicated register state access). Thus, the guest has independent access to a dedicated watch facility, which imposes an area expense. Row 3 corresponds to shared register state access. In this case, the watch facility is shared between root and guest contexts. Root conditionally grants read and write access to guest. Root can eliminate these access writes at any time. This constitutes a virtual guest watch facility.

In reference to Table I, Root-only watch registers (Root Config1$_{WR}$=1 and Guest Config1$_{WR}$=0) allows for Root Watch of Root Virtual Address (RVA) and optionally Guest Physical Address (GPA). Root watch of GPA in this configuration is enabled through Root WatchHi$_{WM}$[0]. If both Root and Guest Watch registers are present (Guest Config1$_{WR}$=1), the Root and Guest Watch will operate independently. Watch exceptions detected on match will be taken in respective modes. The Virtualization Debug definition also allows for virtual Guest Watch via Root Watch registers. (Guest Config1$_{WR}$=0/1). This feature is optional. Root software can test read/write state of Guest Config1$_{WR}$ to determine whether virtual Guest Watch registers are supported.

In virtual sharing mode, watch control may be implemented in accordance with the bit settings of Table II.

TABLE II

| Row Number | Guest Config1$_{WR}$ Value (in R/W State) | Root WatchHi$_{WM}$[1:0] | Function | Guest Exception | Root Exception |
|---|---|---|---|---|---|
| 1 | 0 | X0 | Root Watch RVA | None | Watch |
| 2 | 0 | X1 | Root Watch GPA | None | Watch |
| 3 | 1 | 00 | Root Watch RVA | GPSI | Watch |
| 4 | 1 | 01 | Root Watch GPA | GPSI | Watch |
| 5 | 1 | 10 | Guest Watch GVA | Watch | None |
| 6 | 1 | 11 | Reserved | | |

The first two rows represent the situation where there is only a Root Watch facility. In other words, a virtual watch facility is not available; guest access is blocked. The remaining rows characterize virtual Watch states. Rows three and four are Root Watch states. The Guest exception in these rows is Guest Privileged Sensitive Instruction (GPSI). This means that guest has shared access to a watch facility, but in this state root owns the facility. The root exception column shows root Watch states for rows one through four, but in row five the Watch control is given to the Guest. This is shared register state access. In this state, guest has full read/write access to watch registers.

If Guest Config1$_{WR}$=0, then no watch register pairs are enabled for Guest watch; this is the situation in rows 1 and 2. A Guest access is treated as an unimplemented register as specified in the base architecture. Root WatchHi$_{WM}$[0] determines whether Root is watching RVA or GPA. Root Watch of GPA is optional. If not supported, then a write of 1 to Root WatchHi$_{WM}$[1:0] will write 0, defaulting to RVA watch.

If Guest Config1$_{WR}$=1, then selected Root Watch register pairs are enabled for Root or Guest watch (rows three through six). This is determined by Root WatchHi$_{WM}$[1]. If under root control (rows three and four), then guest access will cause GPSI to root as a method for guest to indicate to root that it needs the watch facility. If under Guest control, Guest can only watch GVA (row five). A write of 3 to Root WatchHi$_{WM}$[1:0] will write 2 in this configuration, defaulting to GVA watch. Root will transition to control of the watch facility by guest by writing 10 to Root WatchHi.WM[1:0].

Root can take away privilege from Guest at any time by writing to Root Watch registers. Thus, Root access will not take an exception on access of a shared pair of registers under Guest control. If under Root control with Root WatchHi$_{WM}$[1]=1 then a Guest access will result in a GPSI. Root may choose to assign this register pair to Guest at this point or return to the guest instruction following the move. In this manner, an implementation dependent number of Root Watch register pairs with sharing enabled can be selectively managed under Root or Guest control.

The disclosed sharing technique can be extended beyond registers. Indeed, any hardware function may be shared in accordance with the disclosed techniques. In fact, a programmable register is the interface to any hardware function so sharing of extended hardware functions works transparently.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.).

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A non-transitory computer readable storage medium, comprising executable instructions to define a processor with:
   guest mode control registers supporting guest mode operating behavior defined by guest context specified in the guest mode control registers, wherein the guest mode control registers include a control bit to specify a guest access blocked register state and a shared register state; and
   root mode control registers supporting root mode operating behavior defined by root context specified in the root mode control registers, wherein the root mode control registers include control bits to enable replicated register state access and shared register state access;
   wherein the guest context and the root context support virtualization of hardware resources such that multiple operating systems supporting multiple applications are executed by the hardware resources.

2. The non-transitory computer readable storage medium of claim 1 wherein the replicated register state access is controlled by the root context.

3. The non-transitory computer readable storage medium of claim 1 wherein the shared register state access allows guest mode access to shared register state without root mode intervention.

4. The non-transitory computer readable storage medium of claim 3 wherein the shared register state is to privileged machine state.

5. The non-transitory computer readable storage medium of claim 3 wherein the shared register state characterizes an operation accessible by the guest mode operating behavior and the root mode operating behavior.

6. The non-transitory computer readable storage medium of claim 5 wherein guest mode operating behavior includes register read and write permissions and the root mode operating behavior includes register read and write permissions.

7. The non-transitory computer readable storage medium of claim 5 wherein the operation is a debug watch operation.

8. The non-transitory computer readable storage medium of claim 5 wherein the operation is selected from performance counting, interrupt handling and cache state monitoring.

9. A non-transitory computer readable storage medium, comprising executable instructions to define a processor with:
   root mode control registers storing root context defining privileged machine state, wherein the root mode control registers include control bits to enable access to replicated privileged machine state and shared access to the privileged machine state; and
   guest mode control registers storing guest context defining guest execution permissions, wherein the guest mode control registers include a control bit to specify a guest access blocked register state and a guest shared register state enabling access to either the replicated privileged machine state or the privileged machine state;
   wherein the guest context and the root context support virtualization of hardware resources such that multiple operating systems supporting multiple applications are executed by the hardware resources.

10. The non-transitory computer readable storage medium of claim 9 wherein the replicated privileged machine state access is controlled by the root context.

11. The non-transitory computer readable storage medium of claim 9 wherein the privileged machine state access is controlled by the guest context.

12. The non-transitory computer readable storage medium of claim 9 wherein the root context characterizes an operation accessible by the guest context.

13. The non-transitory computer readable storage medium of claim 12 wherein guest context includes register read and write permissions and the root context includes register read and write permissions.

14. The non-transitory computer readable storage medium of claim 12 wherein the operation is a debug watch operation.

15. The non-transitory computer readable storage medium of claim 12 wherein the operation is selected from performance counting, interrupt handling and cache state monitoring.

* * * * *